(12) United States Patent
Hara

(10) Patent No.: US 12,267,466 B2
(45) Date of Patent: Apr. 1, 2025

(54) IMAGE FORMING APPARATUS

(71) Applicant: KYOCERA Document Solutions Inc., Osaka (JP)

(72) Inventor: Nobuhiro Hara, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 18/541,543

(22) Filed: Dec. 15, 2023

(65) Prior Publication Data

US 2024/0214495 A1    Jun. 27, 2024

(30) Foreign Application Priority Data

Dec. 27, 2022 (JP) ................... 2022-209796

(51) Int. Cl.
*H04N 1/00* (2006.01)
*G06T 7/00* (2017.01)

(52) U.S. Cl.
CPC ......... *H04N 1/00045* (2013.01); *G06T 7/001* (2013.01); *H04N 1/00005* (2013.01);
(Continued)

(58) Field of Classification Search
CPC ........... H04N 1/00045; H04N 1/00005; H04N 1/00015; H04N 1/00082; H04N 1/00029; H04N 1/0005; H04N 1/0044; H04N 1/00023; H04N 1/00031; H04N 1/00034; H04N 1/00047; H04N 1/00061; H04N 1/00063; H04N 1/00074; H04N 1/00915; H04N 1/32625; H04N 1/6041; H04N 1/00037; H04N 1/00058; H04N 1/00633; H04N 1/32529; H04N 1/00018; H04N 1/00092; H04N 1/00129; H04N 1/00477; H04N 1/00482; G06T 7/001;
(Continued)

(56) References Cited

U.S. PATENT DOCUMENTS 11,720,771 B2 *   8/2023   Kohge ..................... H04N 1/38
                                                    358/1.12
11,822,840 B2 *  11/2023   Fujita .................... G06F 3/1256
(Continued)

FOREIGN PATENT DOCUMENTS

| JP | 2007-033247 | 2/2007 |
| JP | 2014-134401 | 7/2014 |
| JP | 2018-044896 | 3/2018 |

*Primary Examiner* — Negussie Worku

(57) ABSTRACT

A print image generation unit is configured to perform a first rasterization process for printing and thereby generate print image data, and perform a second rasterization process for inspection and thereby generate reference image data, on the basis of a print request. A print unit is configured to perform printing based on the print image data onto a print paper sheet and thereby produce a print product. An image scanning unit is configured to perform image scanning of the print product and thereby generate scan image data. An inspection processing unit is configured to compare the scan image data and the reference image data and thereby perform inspection of the printed matter. Further, the second rasterization process is a rasterization process performed in a rendering condition different from a rendering condition of the first rasterization process.

5 Claims, 2 Drawing Sheets

(52) U.S. Cl.
CPC ............... *H04N 1/00015* (2013.01); *G06T 2207/10024* (2013.01); *G06T 2207/30144* (2013.01)

(58) Field of Classification Search
CPC . G06T 2207/10024; G06T 2207/30144; G06T 2207/10008; G06T 7/11; G03G 15/5062; G03G 2215/00569; G06F 3/1208; G06F 3/1259; G06F 3/1256; G06F 3/1265; G06F 3/1282; G06F 3/1288; G06F 2206/1514; G06F 3/1218; G06V 30/10; G06K 15/027; G06K 15/1836; B41F 33/0036; G01N 2021/8861; G01N 2021/888; G01N 21/8851
USPC ........................................................ 358/504
See application file for complete search history.

(56) References Cited

U.S. PATENT DOCUMENTS

| | | | |
|---|---|---|---|
| 2008/0094631 A1* | 4/2008 | Jung | G01J 3/51 356/419 |
| 2009/0147288 A1* | 6/2009 | Matsuda | G06K 15/02 358/1.9 |
| 2015/0003845 A1* | 1/2015 | Morishita | G03G 15/55 399/15 |
| 2015/0077773 A1* | 3/2015 | Inoue | G06K 15/1867 358/1.9 |
| 2020/0104658 A1* | 4/2020 | Tsuchiya | G06K 15/1836 |
| 2023/0074128 A1* | 3/2023 | Fujita | G06T 7/0002 |
| 2024/0085839 A1* | 3/2024 | Suzuki | G03G 15/5041 |
| 2024/0106935 A1* | 3/2024 | Muraishi | H04N 1/00074 |

* cited by examiner

IMAGE FORMING APPARATUS

CROSS-REFERENCE TO RELATED APPLICATIONS

This application relates to and claims priority rights from Japanese Patent Application No. 2022-209796, filed on Dec. 27, 2022, the entire disclosures of which are hereby incorporated by reference herein.

BACKGROUND

1. Field of the Disclosure

The present disclosure relates to an image forming apparatus.

2. Description of the Related Art

Regarding a printed matter printed in a printing condition on the basis of a master image created by DTP, an inspection method compares an image obtained by scanning the printed matter with a scanning characteristic and an image obtained by correcting the master image with the printing condition and the scanning condition, and thereby checks the printed matter.

An inspection system (a) generates print data of CMYK from correct image data in a Lab space after rasterization, performs printing based on the print data, and thereby produces a printed matter, (c) converts a RGB image obtained by scanning the printed matter to an image in the Lab space, and (d) compares the correct image data in the Lab space and the image of the printed matter in the Lab space and thereby performs inspection.

An inspection apparatus compares an image obtained by performing halftoning and the like for an original image after rasterization and an RGB image obtained by scanning a printed matter on which the original image has been printed and thereby performs inspection.

However, since the aforementioned technique performs image processes (resolution conversion, color conversion, color correction and the like) for an original image generated for printing and thereby generates a reference image, and compares the reference image and a scanned image of a printed matter and thereby performs inspection, these image processes cause a low inspection precision.

SUMMARY

An image forming apparatus according to an aspect of the present disclosure includes a print image generation unit, a print unit, an image scanning unit, and an inspection processing unit. The print image generation unit is configured to perform a first rasterization process for printing and thereby generate print image data, and perform a second rasterization process for inspection and thereby generate reference image data, on the basis of a print request. The print unit is configured to perform printing based on the print image data onto a print paper sheet and thereby produce a print product. The image scanning unit is configured to perform image scanning of the print product and thereby generate scan image data. The inspection processing unit is configured to compare the scan image data and the reference image data and thereby perform inspection of the printed matter. Further, the second rasterization process is a rasterization process performed in a rendering condition different from a rendering condition of the first rasterization process.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
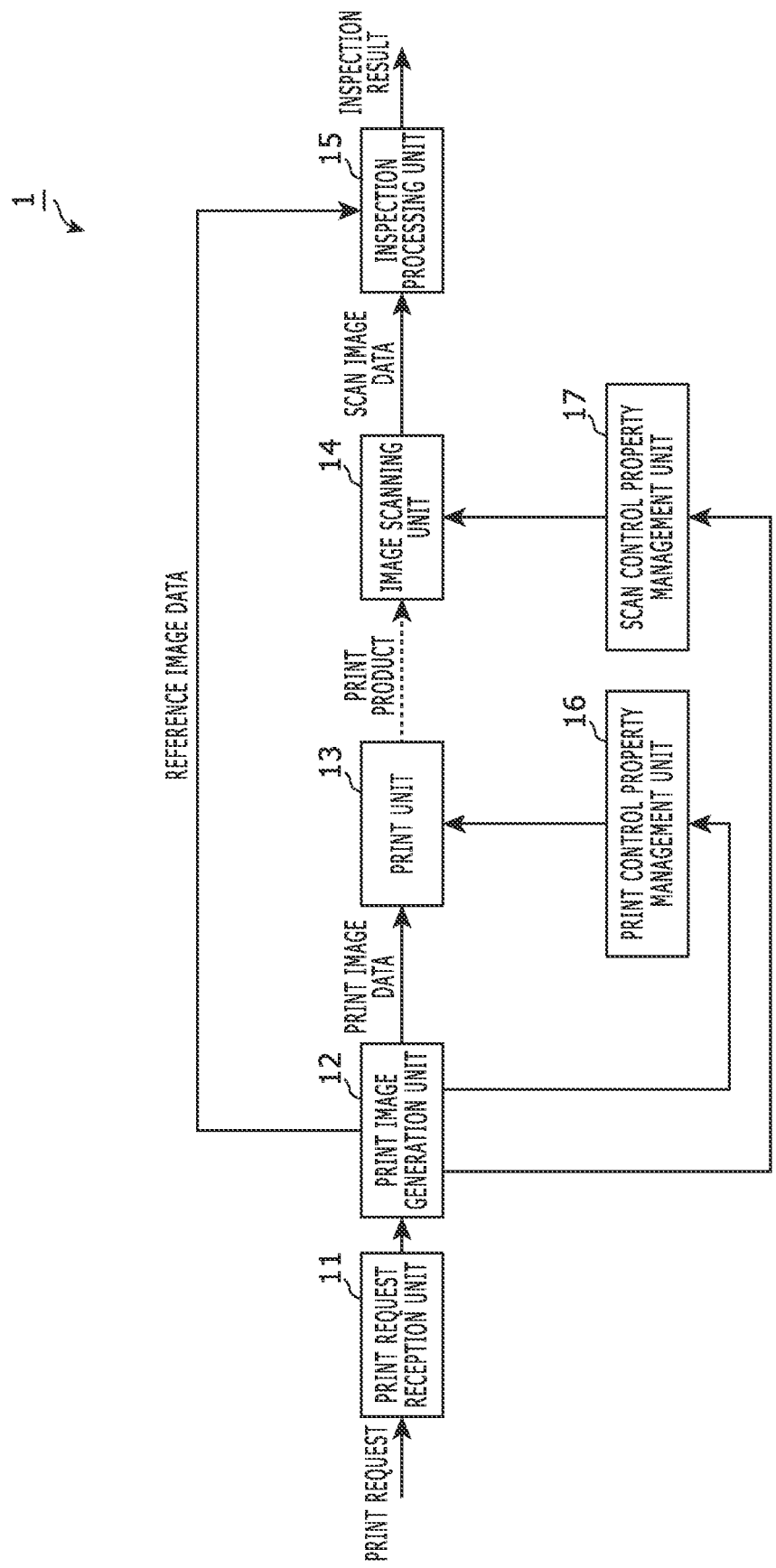
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus 1 shown in FIG. 1 is an apparatus having a printing function such as a printer or a multi function peripheral. The image forming apparatus 1 includes a print request reception unit 11, a print image generation unit 12, a print unit 13, an image scanning unit 14, an inspection processing unit 15, a print control property management unit 16, and a scan control property management unit 17.

The image forming apparatus 1 includes a communication device, an input device, a computer, an ASIC (Application Specific Integrated Circuit), and the like, and acts as the print request reception unit 11, the inspection processing unit 15, the print control property management unit 16, and the scan control property management unit 17 by causing the computer to execute a program.

The print unit 13 performs printing based on print image data onto a print paper sheet using a colorant such as ink or toner according to a predetermined print manner such as electrophotographic manner or inkjet manner, and thereby generates a print product.

The image scanning unit 14 performs optical image scanning of the print product and thereby generates scan image data. For example, the image scanning unit 14 is a line image sensor that is installed in a post stage of the print unit 13 and scans an image of a print paper sheet incoming from the print unit 13.

The print request reception unit 11 receives a print request. The print request is transmitted from an external device and received through a communication device, or is obtained from an input device in accordance with a user operation. The print request includes image information described in a page description language (PDF, LIPS or the like) and a print property information. The print property information includes (a) a print paper sheet type, a print paper sheet size, a color temperature and a chromogenic characteristic of a print paper sheet to be used for printing, (b) an output property (resolution of printing, color setting (color or monochrome), color conversion setting, halftoning type, duplex printing setting and the like), and (c) an inspection property (resolution of the reference image data or the like).

The print image generation unit 12 performs a first rasterization process for printing and thereby generates print image data, and performs a second rasterization process for inspection and thereby generates reference image data, on the basis of the aforementioned print request. The print image generation unit 12 is formed by the aforementioned computer, ASIC and/or the like. The print image data includes image planes of colors of a color space of colorant (here, Cyan, Magenta, Yellow, and Black, or the like) used in the print unit 13. The reference image data includes image planes of colors of a color space same as the color space (here, RGB, that is different from a color space of the print image data) of the image data generated by the image scanning unit 14.

Figure 2:
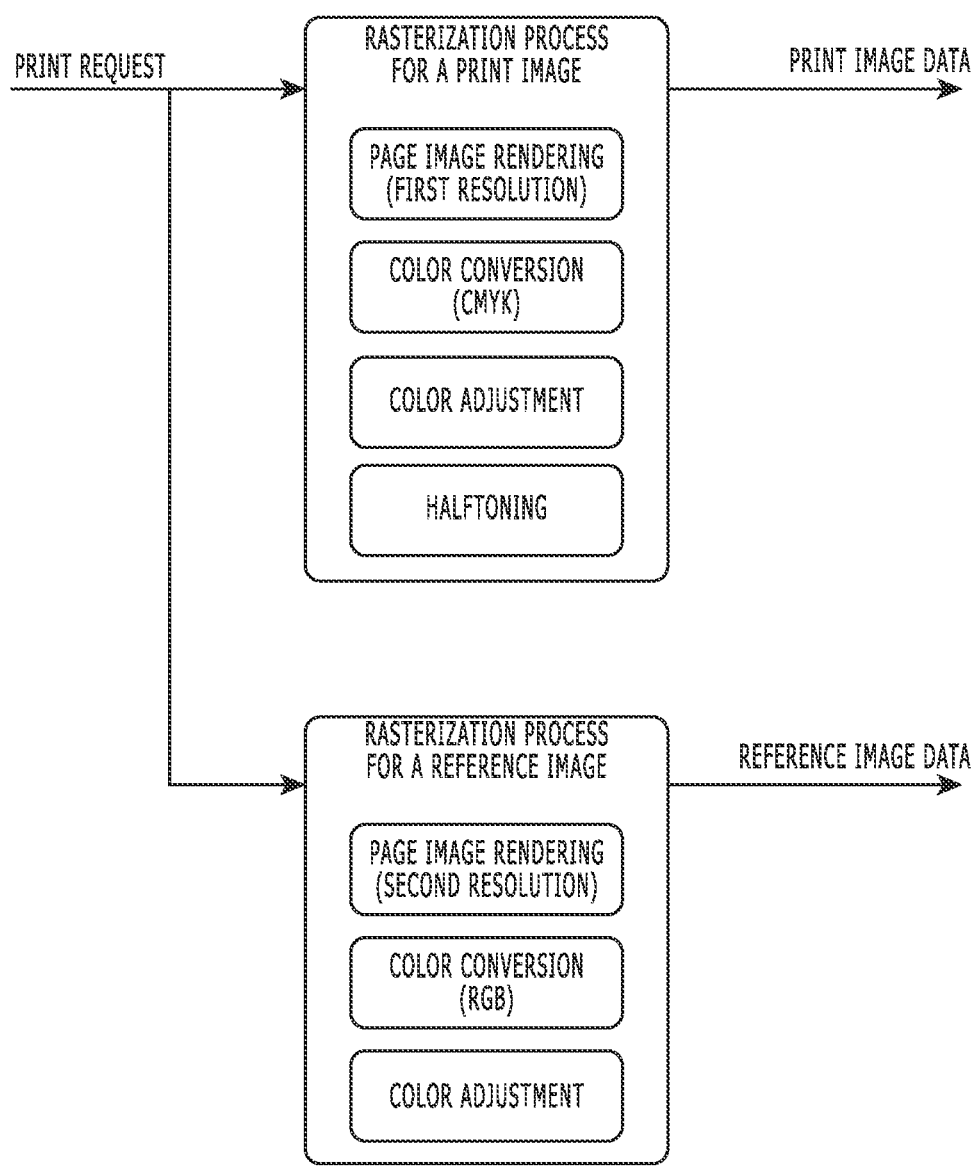
FIG. 2 shows a diagram that explains a behavior of a print image generation unit 12 in FIG. 1.

In the print image generation unit 12, the second rasterization process is a rasterization process performed in a rendering condition different from a rendering condition of the first rasterization process. In these rasterization process, raster image data (print image data) based on the image information described in a page description language is generated in accordance with this rendering condition. FIG. 2 shows a diagram that explains a behavior of a print image generation unit 12 in FIG. 1. As shown in FIG. 2, this rendering condition includes at least one of resolution, color space after color conversion, and color adjustment characteristic (here, includes all of them). A resolution in the second rasterization process is less than a resolution in the first rasterization process. For example, a resolution in the first rasterization process is 600 dpi or 1200 dpi and a resolution in the second rasterization process is 200 dpi.

Further, the second rasterization process may be performed on the basis of a chromogenic characteristic of colorant on the aforementioned print paper sheet. Specifically, on the basis of a difference between a colorimetry result of a print paper sheet as reference on which colorant has been attached and a colorimetry result of a print paper sheet used for printing on which the colorant has been attached, a pixel value of the image to be generated is adjusted. The aforementioned colorimetry result is acquired and stored in a storage device (not shown) in advance, and read and used when needed.

Further, the second rasterization process may be performed on the basis of a color temperature of the print paper sheet. Specifically, on the basis of a difference between a color temperature of a print paper sheet as reference and a color temperature of a print paper sheet used for printing, a pixel value of the image to be generated is adjusted. Regarding the aforementioned color temperature, data of the aforementioned color temperature is acquired and stored in a storage device (not shown) in advance, and read and used when needed.

The inspection processing unit 15 compares the scan image data and the reference image data, and thereby performs inspection of the printed matter. Specifically, the inspection processing unit 15 generates a difference between the aforementioned scan image data and the reference image data (e.g. a difference of pixel values at each pixel position, or the like), and determines a quality of the print product on the basis of this difference. In this inspection, other than the comparison of the aforementioned images, the aforementioned print property information may be taken into account. In addition, as a method of the determination of a quality of the print product, an existent other method may be used.

The print control property management unit 16 acquires the aforementioned output property from the print image generation unit 12 and sets it to the print unit 13. The scan control property management unit 17 acquires the aforementioned inspection property from the print image generation unit 12 and sets a resolution and the like in the inspection property to the image scanning unit 14.

The following part explains a behavior of the aforementioned image forming apparatus 1.

A user operates this image forming apparatus 1 or an external device and thereby creates a print request. The print request reception unit 11 receives the print request.

Upon receiving the print request, the print image generation unit 12 perform the first rasterization process and the second rasterization process and thereby generates print image data and reference image data as mentioned, and provides the print image data to the print unit 13 and provides the reference image data to the inspection processing unit 15.

The print unit 13 performs printing based on the print image data and thereby produces a print product. Afterward, the image scanning unit 14 performs image scanning of the print product and thereby generates scan image data.

Subsequently, the inspection processing unit 15 compares the aforementioned scan image data and the reference image data and thereby performs inspection of the printed matter, and outputs a result of the inspection. For example, the inspection processing unit 15 may select an output destination of the print product in accordance with this inspection result. For example, if the inspection result indicates a good quality, the inspection processing unit 15 outputs the print product to a default output tray, and if the inspection result indicates a bad quality, the inspection processing unit 15 outputs the print product to a purge tray other than the default output tray.

As mentioned, in the aforementioned embodiment, the print image generation unit 12 performs a first rasterization process for printing and thereby generates print image data, and performs a second rasterization process for inspection and thereby generates reference image data, on the basis of a print request. The print unit 13 performs printing based on the print image data onto a print paper sheet and thereby produces a print product. The image scanning unit 14 performs image scanning of the print product and thereby generates scan image data. The inspection processing unit 15 compares the scan image data and the reference image data and thereby performs inspection of the printed matter. Here, the second rasterization process is a rasterization process performed in a rendering condition different from a rendering condition of the first rasterization process.

Consequently, without generating from the print image data the reference image data, the reference image data corresponding to a property (resolution or the like) of the scan image data is generated by the rasterization process, and therefore inspection of the print product is performed with a high inspection precision. Specifically, an image process (resolution conversion or the like) from the print image data to the reference image data is not performed, and consequently, the reference image data has a high image quality, and a high inspection precision is obtained.

It should be noted that this image forming apparatus may perform a variable data printing in which print contents or print conditions are changed sheet by sheet of printed matters. In such a case, the aforementioned inspection can be performed.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
a print image generation unit configured to perform a first rasterization process for printing and thereby generate print image data and perform a second rasterization process for inspection and thereby generate reference image data, on the basis of a print request; wherein the first and second rasterization processes are performed on image information from the print request;
a print unit configured to perform printing based on the print image data onto a print paper sheet and thereby produce a print product;
an image scanning unit configured to perform image scanning of the print product and thereby generate scan image data; and
an inspection processing unit configured to compare the scan image data and the reference image data and thereby perform inspection of the printed matter;
wherein the second rasterization process is a rasterization process performed in a rendering condition different from a rendering condition of the first rasterization process.

2. The image forming apparatus according to claim 1, wherein the rendering condition includes at least one of resolution, color space after color conversion, and color adjustment characteristic.

3. The image forming apparatus according to claim 1, wherein the second rasterization process is performed on the basis of a chromogenic characteristic of colorant on the print paper sheet.

4. The image forming apparatus according to claim 1, wherein the second rasterization process is performed on the basis of a color temperature the print paper sheet.

5. The image forming apparatus according to claim 1, wherein the inspection of the printed matter comprises inspection process generating a difference between the scan image data and the reference image data for each pixel position.

* * * * *